United States Patent
Boyd et al.

(10) Patent No.: US 8,150,806 B2
(45) Date of Patent: Apr. 3, 2012

(54) IDEMPOTENT STORAGE REPLICATION MANAGEMENT

(75) Inventors: Kenneth Wayne Boyd, Tucson, AZ (US); Kenneth F. Day, III, Tucson, AZ (US); Michael Factor, Haifa (IL); Shachar Fienblit, Ein Ayala (IL); Olympia Gluck, Haifa (IL); Thomas Charles Jarvis, Tucson, AZ (US); John Earle Lindley, San Jose, CA (US); Robert Bruce Nicholson, Southsea (GB); Orit Nissan-Messing, Hod HaSharon (IL); William James Scales, Fareham (GB); Aviad Zlotnick, D.N.G.T. (IL)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 11/853,286

(22) Filed: Sep. 11, 2007

(65) Prior Publication Data

US 2009/0070383 A1 Mar. 12, 2009

(51) Int. Cl.
*G06F 7/00* (2006.01)
(52) U.S. Cl. .................................................. 707/634
(58) Field of Classification Search .................. 707/200, 707/610, 634
See application file for complete search history.

(56) References Cited

U.S. PATENT DOCUMENTS

| | | | | |
|---|---|---|---|---|
| 5,720,028 | A * | 2/1998 | Matsumoto et al. | 714/9 |
| 6,484,187 | B1 * | 11/2002 | Kern et al. | 707/204 |
| 7,111,004 | B2 | 9/2006 | Beardsley et al. | |
| 2003/0149848 | A1 * | 8/2003 | Ibrahim et al. | 711/154 |
| 2005/0114464 | A1 | 5/2005 | Amir et al. | |
| 2007/0239944 | A1 * | 10/2007 | Rupanagunta et al. | 711/147 |

* cited by examiner

*Primary Examiner* — Tony Mahmoudi
(74) *Attorney, Agent, or Firm* — Francis Lammes; Stephen J. Walder, Jr.; Randall J. Bluestone

(57) ABSTRACT

A mechanism is provided for managing operations in a data storage system. A first storage controller monitors operation state information associated with a plurality of operation states stored in a data structure. The first storage controller detects a change in the operation state information. The change in the operation state information is in response to a managing entity updating the operation state information to a first operation state in the plurality of operation states in the data structure. Responsive to detecting the change in the operation state information, the first storage controller identifies a reference to a first operation associated with the first operation state updated by the managing entity. The first operation is one operation in a plurality of operations. The first storage controller performs the first operation associated with the first operation state.

23 Claims, 5 Drawing Sheets

IDEMPOTENT STORAGE REPLICATION MANAGEMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to data storage environments and, more particularly, to a system and method for managing data replication in a storage system based on predefined operation states.

BACKGROUND

FIG. 1 illustrates an operating environment 100 for a data storage system in which storage controllers 120 service operation requests or commands issued from a managing entity 110 to replicate data between storage media 140 and 150. After a storage controller 120 performs a requested operation, an acknowledgement is submitted from the storage controller 120 to the managing entity 110 to confirm the completion of the requested operation.

If the acknowledgement is not received by the managing entity 110, for example, due to data loss during transmission, the managing entity 110 will demand for the operation to be performed again, by resubmitting the prior request. Disadvantageously, repeated requests results in duplicate performance of the requested operation. Such additional operations are redundant and undesirable.

Furthermore, in data storage systems with a plurality of storage controllers 120, different storage controller implementations may be present. In such systems, the managing entity 110 will have to support the corresponding proprietary replication algorithm for each storage controller. As such, it is possible that a managing entity will have to be configured to support multiple different types of replication algorithms.

The above-noted lack of unified approach and the requirement for acknowledging each request results in excessive overhead, which is expensive and also burdensome for an administrator of the storage system. Thus, methods and systems are needed that can overcome the aforementioned shortcomings.

SUMMARY

The present disclosure is directed to systems, methods and corresponding products that facilitate managing data replication in a storage system based on predefined operation states.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for managing operations in a data storage system comprising at least a first storage controller operating according to a plurality of operation states set by a managing entity is provided. The method comprises the first storage controller performing a first operation associated with a first operation state, in response to the managing entity updating state information stored in a data structure readable by the first storage controller.

In accordance with another embodiment, the method comprises the managing entity updating a first operation state to a second operation state in a data structure readable by the first storage controller, wherein the first storage controller performs a second operation associated with the second operation state, upon determining a change from the first operation state to the second operation state. Preferably, the first storage controller performs the second operation in absence of a direct request from the managing entity for performing said second operation.

In another embodiment, a computer program product comprising a computer useable medium having a computer readable program is provided. The computer readable program when executed on a computer causes the computer to perform the above-noted operations.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate managing data replication in a storage system based on predefined operation states.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
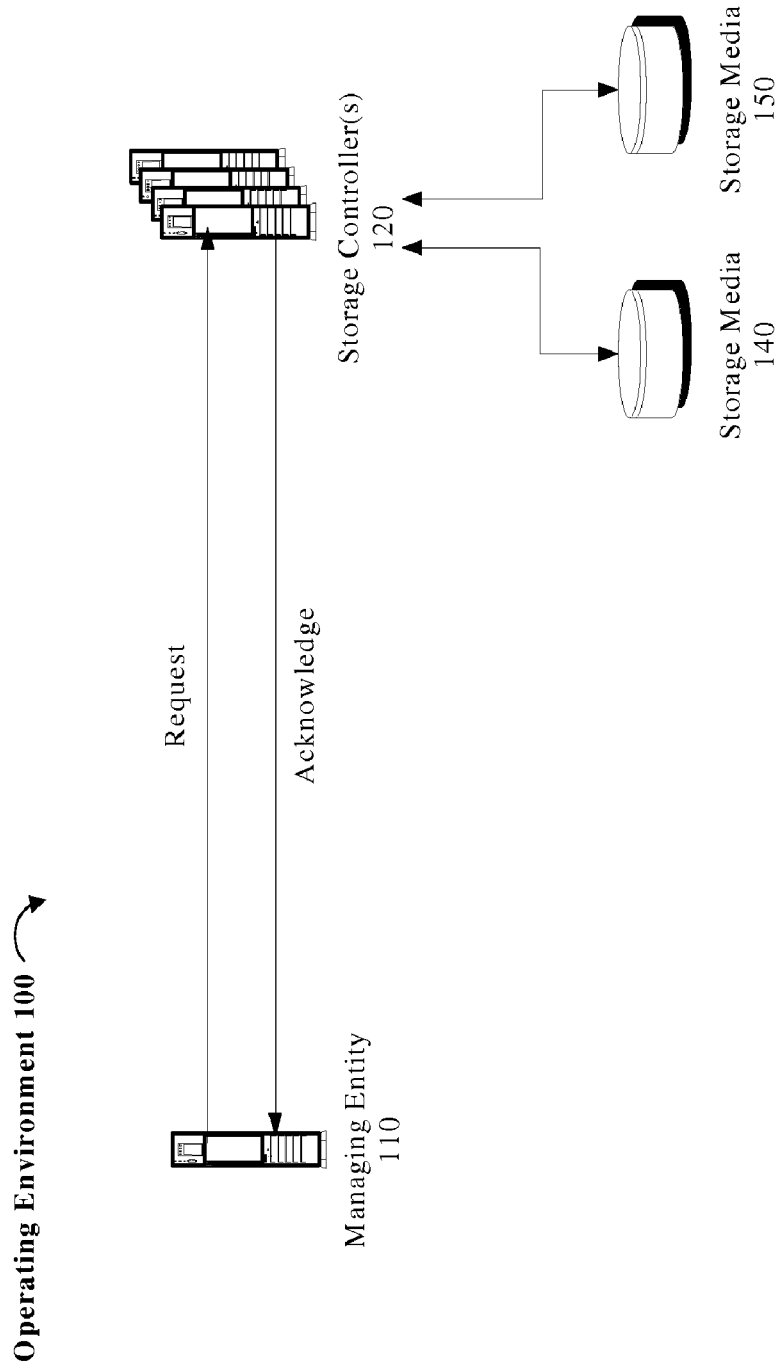
FIG. 1 illustrates an exemplary operating environment illustrating a communication routine between a managing entity and storage controller(s) in a storage network.
Figure 2:
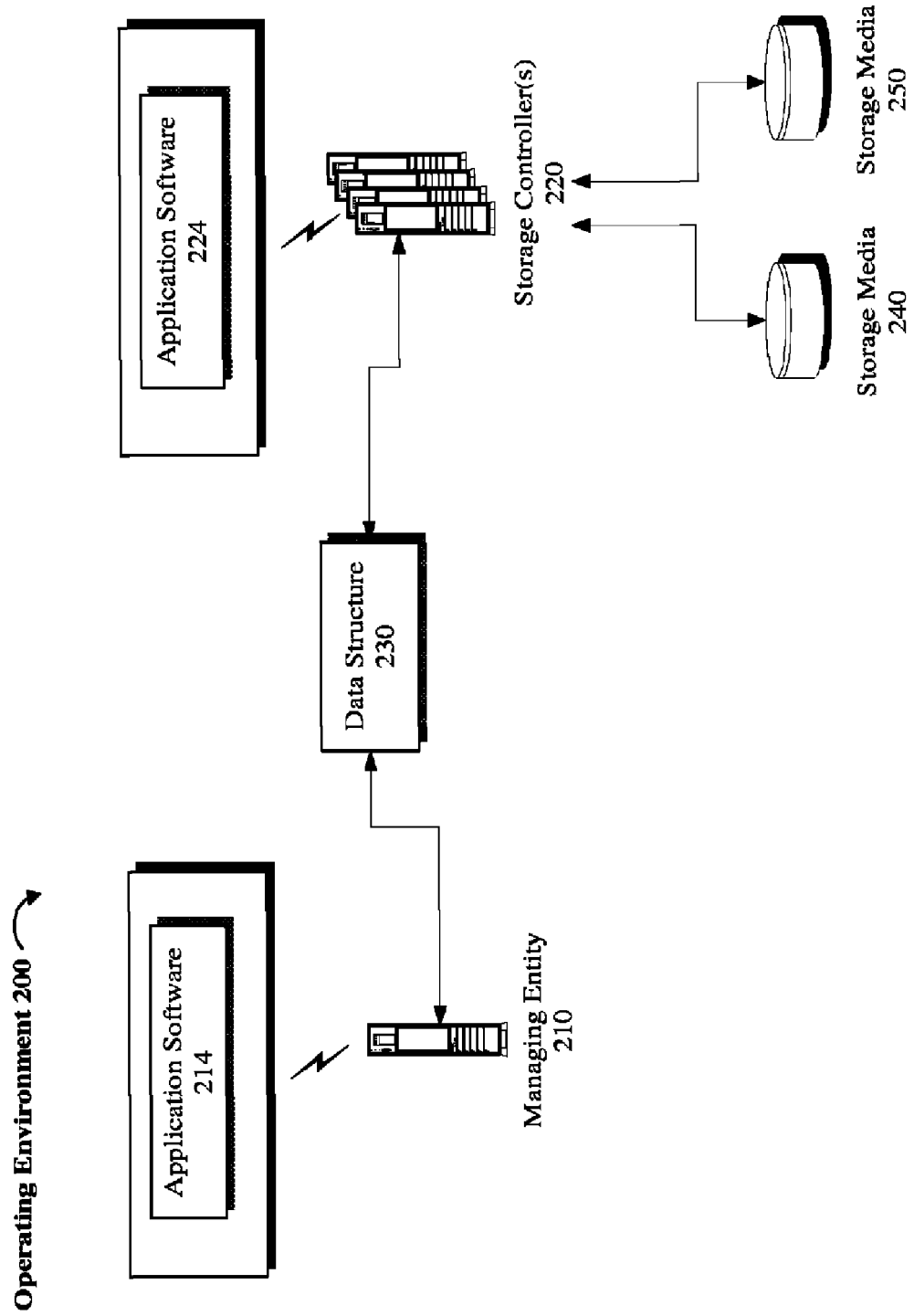
FIG. 2 illustrates an exemplary operating environment illustrating another communication routine between a managing entity and storage controller(s) in a storage network, in accordance with one embodiment.

Referring to FIG. 2, an exemplary operating environment 200 is illustrated in which a managing entity 210 and one or more storage controllers 220 are operational to manage data replication in a data storage system. Application software 214 is executed on managing entity 210 to update operation state information stored in a data structure 230. Application software 224 is executed on one or more storage controllers 220 to perform one or more operations in response to a change in an operation state stored in data structure 230. Preferably, data structure 230 and application software 224 are stored in a storage medium local to the storage controller 220.

In accordance with one implementation, in the following, one or more embodiments are disclosed as applicable to a data storage environment in which certain operations are performed to manage data replication. Therefore, certain examples provided here are applicable to logical operations and events that are utilized in a data replication context. It is noteworthy, however, that the scope of the invention should not be construed as limited to such exemplary embodiments, rather the suggested principals may be applicable to any client-server environment.

Figure 3:
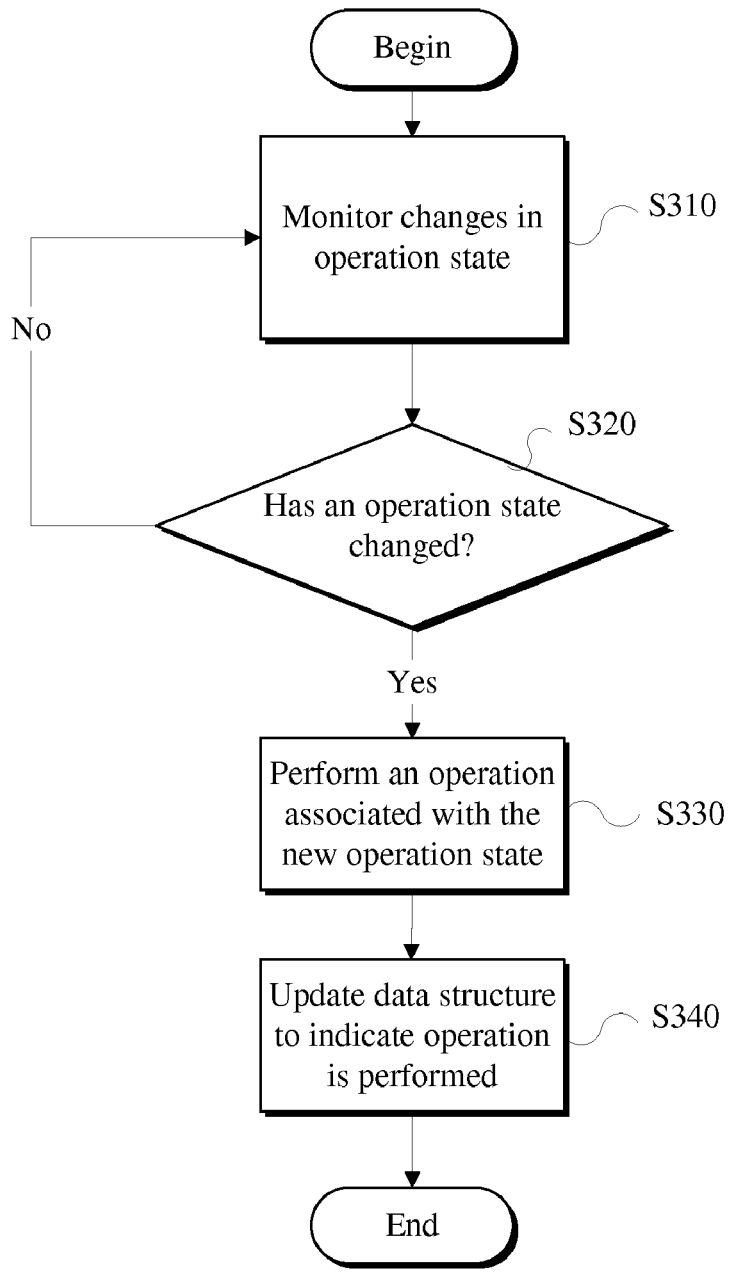
FIG. 3 is a flow diagram of a method for monitoring the operation state of the exemplary system of FIG. 2, in accordance with one embodiment.

Referring to FIGS. 2 and 3, application software 224 is configured to monitor changes in operation state information stored in data structure 230 (S310). Data structure 230 may comprise one or more data tables, data arrays, linked lists, relational databases or other types of logical data structure suitable for storing operation state information. In one embodiment, for example, data structure 230 may be utilized to store status information (e.g., on/off status) about various operational states of a data storage system (e.g., initial copy state, split writes state, read from secondary on error state, etc.).

In some embodiments, in addition to the status information, data structure 230 may also comprise a reference to a relationship between an operational state and an event or operation (e.g., initial copy, split writes, read from secondary on error, etc.) to be performed by application software 224. Thus, once application software 224 detects a change from a first operation state to a second operation state (S320), application software 224 performs the respective operation associated with the second operation state (S330).

In exemplary embodiments, the relationships may be defined as objects that are ordered pairs of storage volumes (e.g., storage media 240 and 250) and different sets between these volumes. The different sets are called region lists. A set of independent behavior patterns may be defined that may be combined to form replication solutions between said volumes.

The behavior patterns in one embodiment are defined by various operation states, such that, as provided above, application software 214 can update said operational states to cause a storage controller 220 to change its behavior (e.g., to perform an operation associated with the updated state). For example, changing a copy state may cause a copy operation to be performed by a storage controller 220.

In some embodiments, application software 214 may define rules that govern the behavior of objects that have overlapping storage volumes. Accordingly, a storage controller 220 may export a virtual machine whose objects are the relationships, and whose machine language comprises the operation states, for example.

In an exemplary embodiment, the following operation states can be defined:

| Track write operations in region list |
| --- |
| on |
| off |
| Volume reserve |

| none |
| --- |
| temporary |
| persistent |
| Host write processing |

| allow |
| --- |
| queue |
| inhibit |
| Host read processing |

| allow |
| --- |
| queue |
| inhibit |
| Write location (where to write to) |

| 1st volume in the relationship |
| --- |
| 2nd volume in the relationship |
| both |
| Read location (where to read from) |

| 1st volume in the relationship |
| --- |
| 2nd volume in the relationship |
| 2nd volume only for regions in the region list |
| both - use first result |
| both - verify same content |
| either |
| Copy volume content |

| none |
| --- |
| 1st to 2nd |
| 2nd to $1^{st}$ |
| Copy region list |

| none |
| --- |
| 1st to 2nd |
| 2nd to 1st |
| merge 1st to 2nd |
| merge 2nd to 1st |

The above list is not meant to be exhaustive of all operational states, nor should it be construed as anything other than an exemplary list provided for the purpose of disclosing certain exemplary embodiments. As such, depending on implementation, additional operation states can be defined. For example, further operational states may be defined for error conditions, such as failed writes or reads.

In accordance with one embodiment, relationships and operation states are nonvolatile and persistent (i.e., stored on disk or in flash memory) and the process of updating the operation states in data structure 230 is idempotent, because the process updates the state values rather than requesting for an operation to be performed and acknowledged. Further, in some embodiments, one or more operation states may have automatic value changes. For example, a copy state may return to "none" after a copy operation is completed. Such transitions may be accompanied by notifications that can be captured by application software 214.

Thus, in one or more embodiments, application software 214 running on managing entity 210 modifies data stored in data structure 230 to update one or more operation states. Advantageously, once an operation state is updated to a new operation state, storage controller 220 performs an operation associated with the new operation state. For example, the data structure may be updated to indicate that a first operation is requested, or that an operation is scheduled to be performed or is in progress, or that an operation has been performed (i.e., completed).

Accordingly, in some embodiments, there may be no need for managing entity 210 to forward a request directly to storage controller 220 to demand the performance of a certain operation. Further, in some embodiments, there may be no need for the storage controller 220 to provide an acknowledgement in response to performing the requested operation.

The lack of a requirement for managing entity 210 submitting a request, and for storage controller 220 responding with an acknowledgement has several advantages over the related art methods and systems. First, the system overhead associated with managing, sending and receiving the requests and acknowledgments is eliminated or reduced. Second, managing entity 210 and application software 214 will be less complex and more robust since they will not need to support various replication algorithms or communicate with various application software 224 implemented for different storage controllers 220. Third, the possibility of duplicative requests, in the event that an acknowledgment is lost, is reduced or eliminated. Fourth, implementing an interface between managing entity 210 and storage controllers 220 can be achieved at relatively low cost.

It should be noted, however, that as suggested earlier in certain embodiments storage controller 220 may be configured to update data structure 230 or another data structure (not shown) to indicate that an operation has been performed. It is also noteworthy that the above update procedure, depending on implementation, may be applicable to a select few operations or operation states. That is, in some embodiments, for certain operations, managing entity 210 may continue to directly submit requests to storage controllers 220.

As such, in one or more embodiments, the above-disclosed status update scheme may be utilized in combination with a request-acknowledgement scheme. For example, a first operation may be performed in response to managing entity 210 updating an operation status stored in data structure 230 for a first operation, and a second operation may be performed in response to managing entity 210 submitting a request directly to a storage controller 220 to perform the second operation.

In different embodiments, the invention can be implemented either entirely in the form of hardware or entirely in the form of software, or a combination of both hardware and software elements. For example, computing systems 210, 220 and application software 214, 224 may comprise a controlled computing system environment that can be presented largely in terms of hardware components and software code executed to perform processes that achieve the results contemplated by the system of the present invention.

Figure 4:
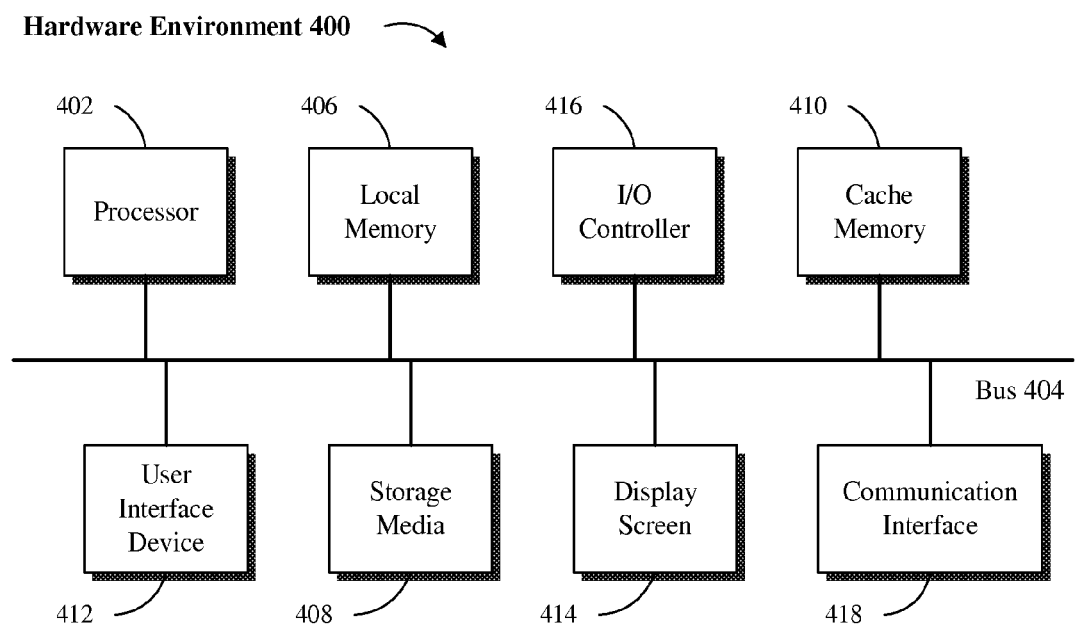
FIGS. 4 and 5 are block diagrams of hardware and software environments in which a system of the present invention may operate, in accordance with one or more embodiments.
Figure 5:
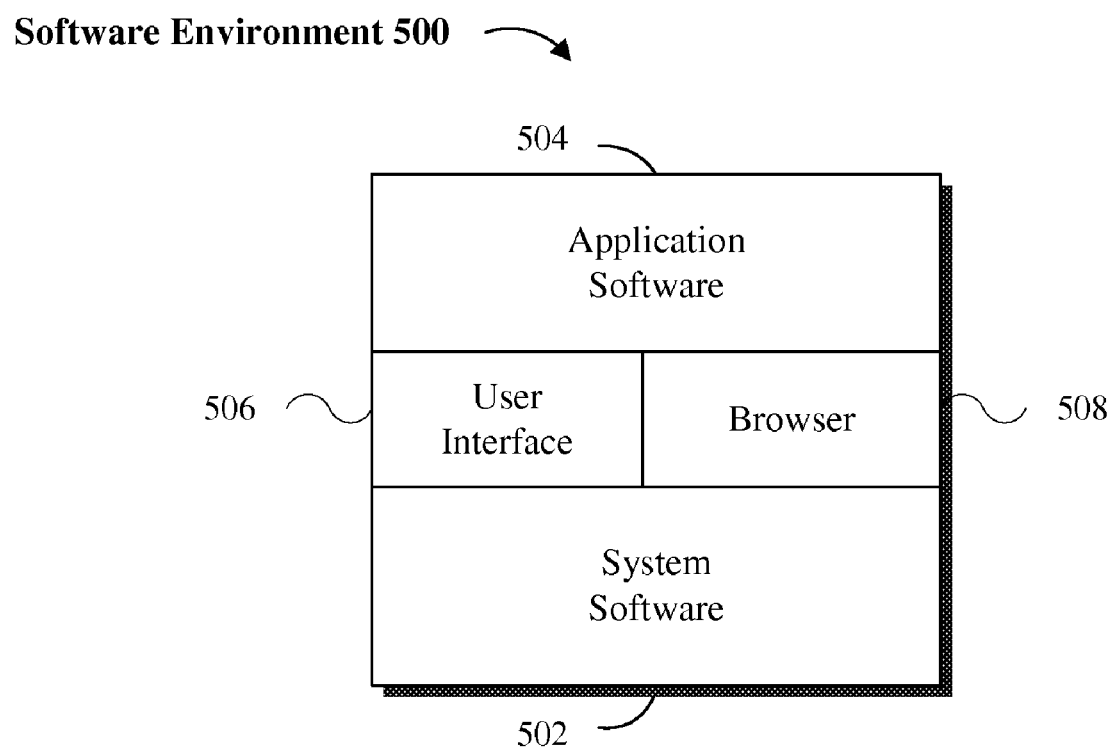

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, application software 214 and 224 may be implemented as system software 502 or application software 504 executed on one or more hardware environments. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of an operating system after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for managing operations in a data storage system, the method comprising:
    monitoring, by a first storage controller, operation state information associated with a plurality of operation states stored in a data structure;
    detecting, by the first storage controller, a change in the operation state information, wherein the change in the operation state information is in response to a managing entity, which is external to the first storage controller, updating the operation state information to a first operation state in the plurality of operation states in the data structure and wherein the managing entity updates the operation state information stored in the data structure, instead of directly communicating a request to the first storage controller for performing a first operation, to cause the first storage controller to perform the first operation;
    responsive to detecting the change in the operation state information, identifying, by the first storage controller, a reference to the first operation associated with the first operation state updated by the managing entity, wherein the first operation is one operation in a plurality of operations; and
    performing, by the first storage controller, the first operation associated with the first operation state updated by the managing entity.

2. The method of claim 1, wherein the first storage controller operates based on a first proprietary operation algorithm and wherein the managing entity sets the plurality of operation states independent of the proprietary operation algorithm implemented for the first storage controller.

3. The method of claim 1, further comprising:
    determining, by the first storage controller, whether the first operation state stored in the data structure is updated by the managing entity to a second operation state;
    identifying, by the first storage controller, a reference to a second operation associated with the second operation state updated by the managing entity, wherein the second operation is different operation from the first operation and wherein the second operation is another operation in the plurality of operations; and
    performing, by the first storage controller, the second operation associated with the second operation state updated by the managing entity.

4. The method of claim 3, wherein the data structure comprises the plurality of operation states and the plurality of operations, and wherein each operation state in the plurality of operation states is associated with an operation in the plurality of operations for replicating data in the data storage system.

5. A method for managing operations in a data storage system, the method comprising:
    monitoring, by a first storage controller, operation state information associated with a plurality of operation states stored in a data structure;
    detecting, by the first storage controller, a change in the operation state information, wherein the change in the operation state information is in response to a managing entity, which is external to the first storage controller, updating a first operation state to a second operation state in the plurality of operation states in the data structure, wherein the managing entity updates the first operation state to the second operation state in the data structure, instead of directly communicating a request to the first storage controller for performing a second operation, to cause the first storage controller to perform the second operation;
    responsive to detecting the change in the operation state information, identifying, by the first storage controller, a reference to the second operation associated with the second operation state updated by the managing entity, wherein the second operation is one operation in a plurality of operations; and
    performing, by the first storage controller, the second operation associated with the second operation state updated by the managing entity.

6. The method of claim 5, wherein the first storage controller performs the second operation in absence of a direct request from the managing entity for performing said second operation.

7. The method of claim 5, wherein determining the change from the first operation state to the second operation state comprises:
    periodically examining, by the first storage controller, the data structure for any changes in data recorded in the data structure.

8. The method of claim 7, further comprising:
determining, by the first storage controller, the second operation associated with the second operation state based on a logical relationship between the second operation and the second operation state, wherein said relationship is stored in the data structure.

9. A system for managing operations in a data storage system, the system comprising:
a processor; and
a memory coupled to the processor, wherein the memory comprises instructions which, when executed by the processor, cause the processor to:
monitor operation state information associated with a plurality of operation states stored in a data structure;
detect a change in the operation state information, wherein the change in the operation state information is in response to a managing entity, which is external to the first storage controller, updating the operation state information to a first operation state in the plurality of operation states in the data structure, wherein the managing entity updates the operation state information stored in the data structure, instead of directly communicating a request to the first storage controller for performing a first operation, to cause the first storage controller to perform the first operation;
responsive to detecting the change in the operation state information, identify a reference to the first operation associated with the first operation state updated by the managing entity, wherein the first operation is one operation in a plurality of operations; and
perform the first operation associated with the first operation state updated by the managing entity.

10. The system of claim 9, wherein the first storage controller operates based on a first proprietary operation algorithm and wherein the managing entity sets the plurality of operation states independent of the proprietary operation algorithm implemented for the first storage controller.

11. The system of claim 9, wherein the instructions further cause the processor to:
determine whether the first operation state stored in the data structure is updated by the managing entity to a second operation state;
identify a reference to a second operation associated with the second operation state updated by the managing entity, wherein the second operation is different operation from the first operation and wherein the second operation is another operation in the plurality of operations; and
perform the second operation associated with the second operation state updated by the managing entity.

12. A computer program product comprising a non-transitory computer-readable medium having a computer readable program, wherein the computer readable program when executed on a computer causes the computer to:
monitor operation state information associated with a plurality of operation states stored in a data structure;
detect a change in the operation state information, wherein the change in the operation state information is in response to a managing entity, which is external to the first storage controller, updating the operation state information to a first operation state in the plurality of operation states in the data structure, wherein the computer readable program when executed on a computer causes the computer to have the managing entity update the operation state information stored in the data structure, instead of directly communicating a request to the first storage controller for performing a first operation, to cause the first storage controller to perform the first operation;

responsive to detecting the change in the operation state information, identifying a reference to the first operation associated with the first operation state updated by the managing entity, wherein the first operation is one operation in a plurality of operations; and
perform the first operation associated with the first operation state updated by the managing entity.

13. The computer program product of claim 12, wherein the computer readable program when executed on the computer further causes the computer to operate the first storage controller based on a first proprietary operation algorithm and wherein the managing entity sets the plurality of operation states independent of the proprietary operation algorithm implemented for the first storage controller.

14. The computer program product of claim 12, wherein the computer readable program when executed on a computer causes the computer to:
determine whether the first operation state stored in the data structure is updated by the managing entity to a second operation state;
identify a reference to a second operation associated with the second operation state updated by the managing entity, wherein the second operation is different operation from the first operation and wherein the second operation is another operation in the plurality of operations; and
perform the second operation associated with the second operation state updated by the managing entity.

15. The computer program product of claim 12, wherein the computer readable program when executed on a computer causes the computer to update the data structure to reflect that the first operation has been completed.

16. The method of claim 1, further comprising updating the data structure to reflect that the first operation is being performed.

17. The method of claim 1, further comprising updating the data structure to reflect that the first operation is scheduled to be performed.

18. The method of claim 1, further comprising updating the data structure to reflect that the first operation has been completed.

19. The computer program product of claim 12, wherein the computer readable program when executed on a computer causes the computer to update the data structure to reflect that the first operation is being performed.

20. The computer program product of claim 12, wherein the computer readable program when executed on a computer causes the computer to update the data structure to reflect that the first operation is scheduled to be performed.

21. The computer program product of claim 12, wherein the data structure comprises the plurality of operation states and a plurality of operations, and wherein each operation state in the plurality of operation states is associated with an operation in the plurality of operations for replicating data in the data storage system.

22. The system of claim 9, wherein the data structure comprises the plurality of operation states and a plurality of operations, and wherein each operation state in the plurality of operation states is associated with an operation in the plurality of operations for replicating data in the data storage system.

23. The system of claim 9, further comprising updating the data structure to reflect that the first operation is at least one of being performed, scheduled to be performed, or has been completed.

* * * * *